US012782532B2

(12) United States Patent
Lin et al.

(10) Patent No.: US 12,782,532 B2
(45) Date of Patent: Nov. 3, 2026

(54) VEHICLE RADAR

(71) Applicant: TUNG THIH ELECTRONIC CO., LTD., Taoyuan City (TW)

(72) Inventors: Chi-Sheng Lin, Taoyuan City (TW); Cheng-Jun Huang, Taoyuan City (TW)

(73) Assignee: TUNG THIH ELECTRONIC CO., LTD., Taoyuan City (TW)

( * ) Notice: Subject to any disclaimer, the term of this patent is extended or adjusted under 35 U.S.C. 154(b) by 246 days.

(21) Appl. No.: 18/664,316

(22) Filed: May 15, 2024

(65) Prior Publication Data

US 2025/0291041 A1 Sep. 18, 2025

(30) Foreign Application Priority Data

Mar. 14, 2024 (TW) ................................ 113109476

(51) Int. Cl.

*G01S 7/52* (2006.01)
*G01S 7/521* (2006.01)
*G01S 15/931* (2020.01)

(52) U.S. Cl.

CPC ............ *G01S 7/521* (2013.01); *G01S 15/931* (2013.01)

(58) Field of Classification Search

CPC .. G01S 7/521; G01S 15/931; G01S 2015/937; G01S 7/03; G01S 13/931

See application file for complete search history.

(56) References Cited

U.S. PATENT DOCUMENTS 3,842,930 A * 10/1974 Fiala ........................ B60R 21/33 180/274
12,313,844 B1 * 5/2025 Labadie ................ G01S 17/931
2016/0033638 A1 * 2/2016 Silc ........................ G01S 13/867 342/55
2019/0331509 A1 * 10/2019 Pizzimenti .............. B60R 11/00
2022/0365175 A1 * 11/2022 Phinisee ............. B60W 60/001

* cited by examiner

*Primary Examiner* — Syed O Hasan

(57) ABSTRACT

A vehicle radar includes a sensor, a housing, and a decoupling member. The housing accommodates at least a portion of the sensor. The decoupling member abuts against the sensor and is formed to have at least one drainage channel in communication with an exterior of the housing. The housing includes a front portion, the sensor protrudes relative to the front portion, and the decoupling member covers another portion of the sensor and the front portion. The decoupling member is further formed to have a storage tank, which is disposed between the sensor and the at least one drainage channel and is in communication with the at least one drainage channel.

7 Claims, 13 Drawing Sheets

Y-Y

VEHICLE RADAR

CROSS-REFERENCE TO RELATED APPLICATION

This non-provisional application claims priority under 35 U.S.C. § 119(a) on patent application Ser. No. 113109476 filed in Taiwan, R.O.C. on Mar. 14, 2024, the entire contents of which are hereby incorporated by reference.

BACKGROUND OF THE INVENTION

1. Field of the Invention

The present disclosure relates to vehicle radars, and in particular to a vehicle radar having a drainage channel.

2. Description of the Related Art

Automobiles are one of the essential modes of transportation in people's daily lives. In general, in order to avoid collision with other vehicles or obstacles during driving or reversing, a vehicle radar capable of detecting a distance from a vehicle body and another vehicle or obstacle is usually disposed around the vehicle body. By non-contact detection techniques such as ultrasonic and optical sensing, a driver can stay informed of a safety distance for driving or reversing, so as to prevent vehicle body damage and safety issues derived therefrom.

BRIEF SUMMARY OF THE INVENTION

Taking an ultrasonic vehicle radar for example, while the radar is operating, an internal sensor vibrates to transmit or receive signals. In order to prevent a bumper of a vehicle coming into contact with the sensor or resonating with it to affect contents of the signals, a designer provides a decoupling element or a decoupling ring inside the radar. However, a conventional decoupling ring covers a small portion of an edge of the sensor, and issues such as deformation and warping can easily occur once the elements age. In addition, in applications in certain severe weather conditions (for example, in the winter or rainy season), rain water, snow, or frost in the ambient environment is likely to accumulate on a surface of the sensor, leading to distorted sensing results.

In order to overcome the disadvantages of the prior art, the present invention provides a vehicle radar having a drainage channel with the aim of achieving effects of preventing external substances such as rain water or snow water from damaging a sensor.

The present disclosure provides a vehicle radar including a sensor, a housing, and a decoupling member. The housing accommodates at least a portion of the sensor. The decoupling member abuts against the sensor and is formed to have at least one drainage channel in communication with an exterior of the housing.

In an embodiment, the housing includes a front portion, the sensor protrudes relative to the front portion, and the decoupling member covers another portion of the sensor and the front portion.

In an embodiment, the decoupling member is further formed to have a storage tank, which is disposed between the sensor and the drainage channel and is in communication with the drainage channel.

In an embodiment, the decoupling member sleeves the sensor and includes an inner wall, the storage tank is formed on the inner wall, and a gap is formed between the inner wall and the sensor.

In an embodiment, the decoupling member defines a circumferential direction, and the storage tank extends along the circumferential direction and has an enclosed loop shape.

In an embodiment, a plurality of drainage channels are provided, the decoupling member defines a circumferential direction, and these drainage channels are spaced apart equidistantly along the circumferential direction.

In an embodiment, the drainage channel has a first end and a second end, and the first end is disposed between the sensor and the second end. When the vehicle radar is disposed in a vehicle, a height of the first end is greater than or equal to that of the second end.

In an embodiment, the housing includes a plurality of decoupling engaging portions, the decoupling member includes a plurality of housing engaging portions, and the decoupling engaging portions are engaged with the housing engaging portions.

In an embodiment, the decoupling member defines a circumferential direction, and these housing engaging portions are spaced apart non-equidistantly along the circumferential direction.

In an embodiment, the decoupling member is a rubber sleeve.

Thus, the vehicle radar of the present disclosure is able to discharge accumulated water, accumulated snow or dirt between the sensor and the decoupling member via the drainage channel of the decoupling member, thereby achieving the effects of preventing external substances such as rain water or snow from damaging the sensor.

To better understand the features and advantages of the present disclosure, embodiments are described in detail with reference to the accompanying drawings below.

DETAILED DESCRIPTION OF THE INVENTION

The above and other technical contents, features and effects of the present disclosure can be clearly presented in the detailed description of the preferred embodiments with reference to the accompanying drawings. It should be noted that, the directional terms used in the embodiments below, for example, upper, lower, left, right, front, and back are merely provided with reference to the directions of the accompanying drawings. Thus, the directional terms are for illustration purposes and are not to be construed as limitations to the present disclosure. Moreover, in the embodiments below, the same or similar elements are represented by the same or similar denotations or numerals.

Figure 1:
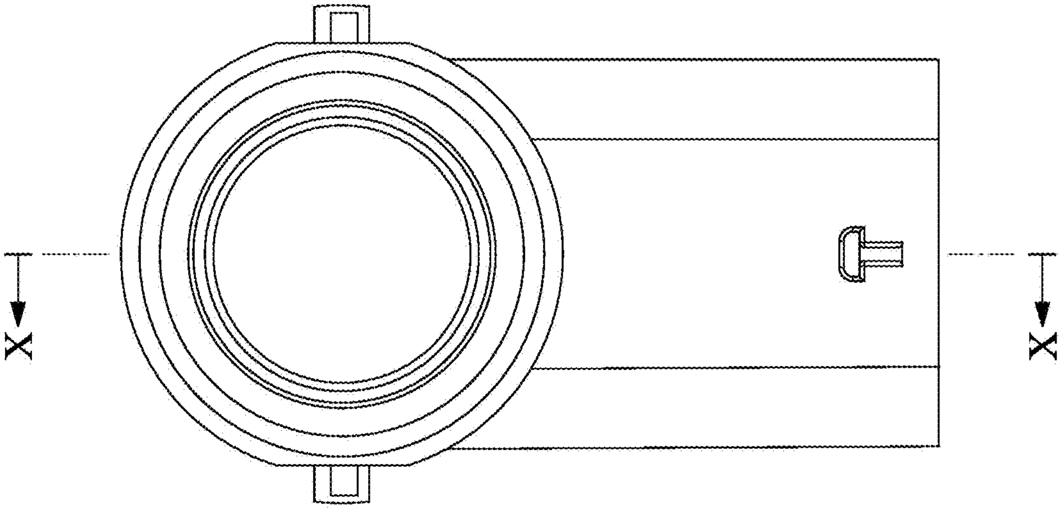
FIG. 1 is a front schematic diagram of a vehicle radar according to an embodiment of the present disclosure.
Figure 2:
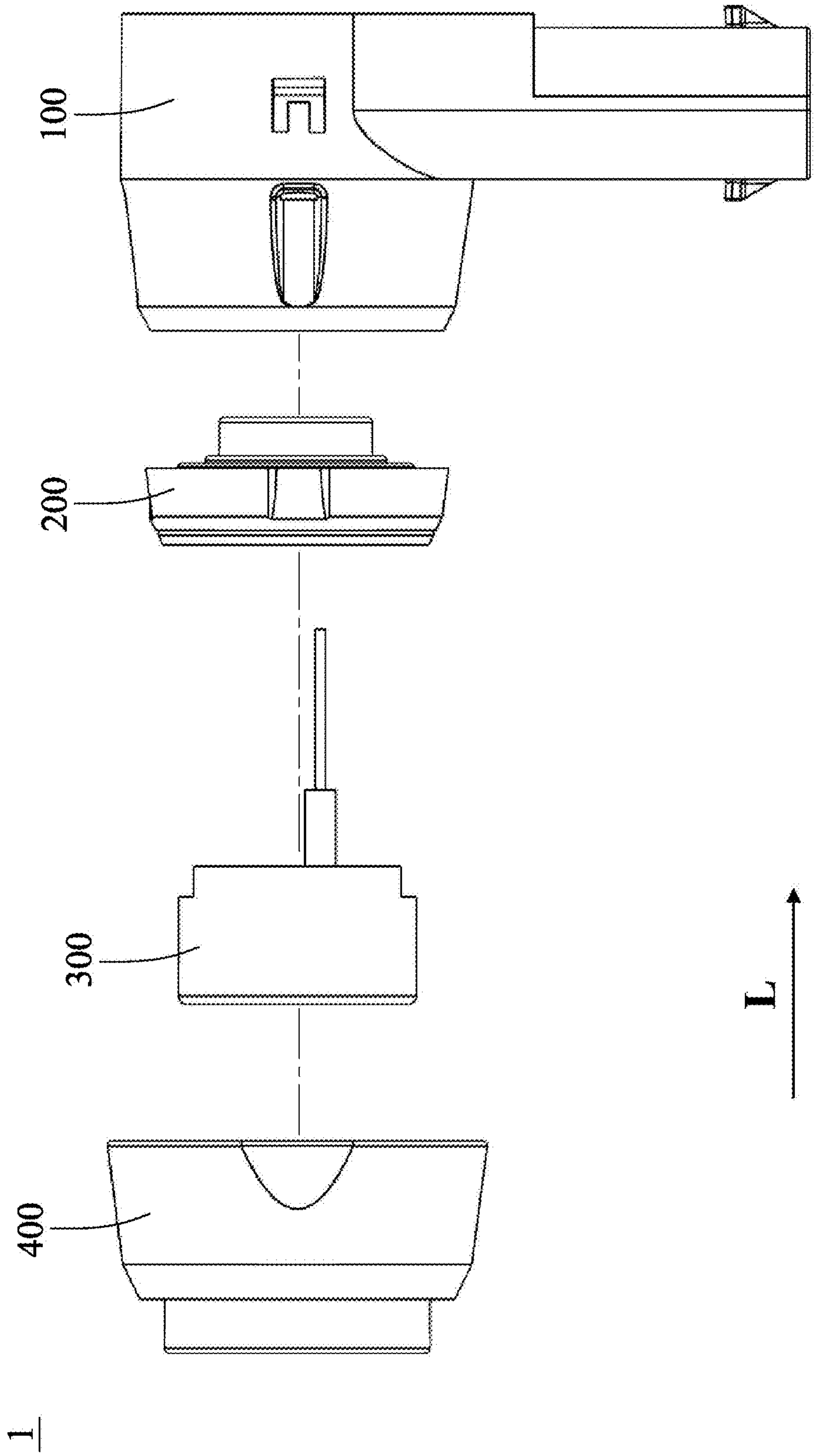
FIG. 2 is an exploded schematic diagram of FIG. 1.

Referring to FIG. 1 and FIG. 2, FIG. 1 shows a front schematic diagram of a vehicle radar according to an embodiment of the present disclosure, and FIG. 2 shows an exploded schematic diagram of FIG. 1. A vehicle radar 1 of an embodiment is applicable to a common vehicle, a large vehicle, or an industrial vehicle, and includes a housing 100, a base 200, a sensor 300, and a decoupling member 400. The housing 100 is, for example, a plastic member formed by means of injection molding. The base 200 substantially appears as a disc shape and is made of a plastic with a lower hardness. The sensor 300 is, for example, a directional ultrasonic sensor, and is disposed on the base 200 and is assembled at the housing 100 via the base 200. The decoupling member 400 is, for example, a flexible rubber sleeve, and abuts against the sensor 300 to prevent resonance between the sensor 300 and the vehicle. Thus, when the sensor 300 receives an ultrasonic signal reflected by an obstacle or another vehicle, the ultrasonic signal can be converted into an electrical signal that is then transmitted via a connection terminal inside the housing 100 to a control element for signal processing, thereby reminding a user of an accurate distance between the currently driven vehicle and the obstacle or the another vehicle. These elements can be assembled along a longitudinal direction L to thereby form the vehicle radar 1 in FIG. 1.

Figure 3:
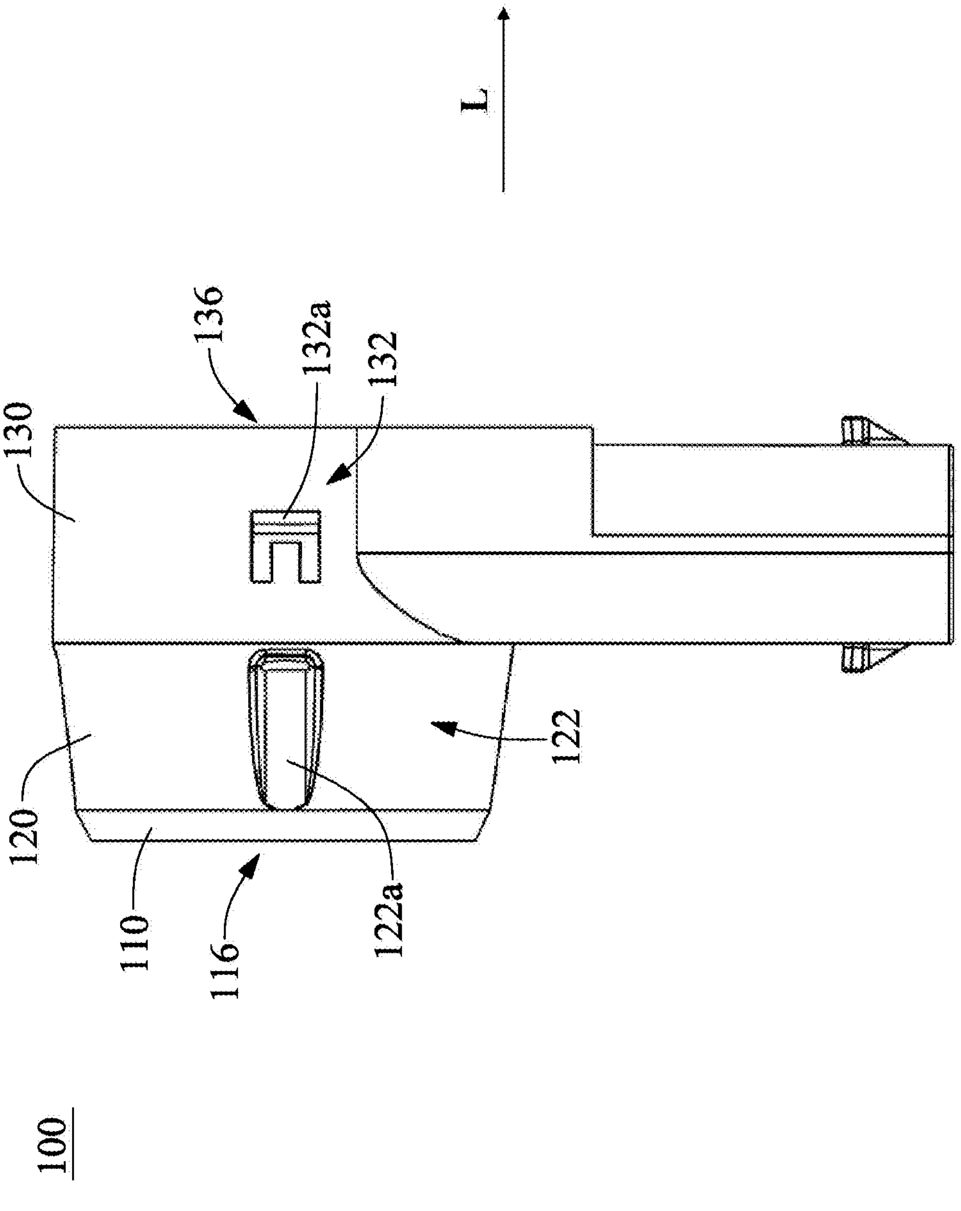
FIG. 3 is a right schematic diagram of the housing in FIG. 2.
Figure 4:
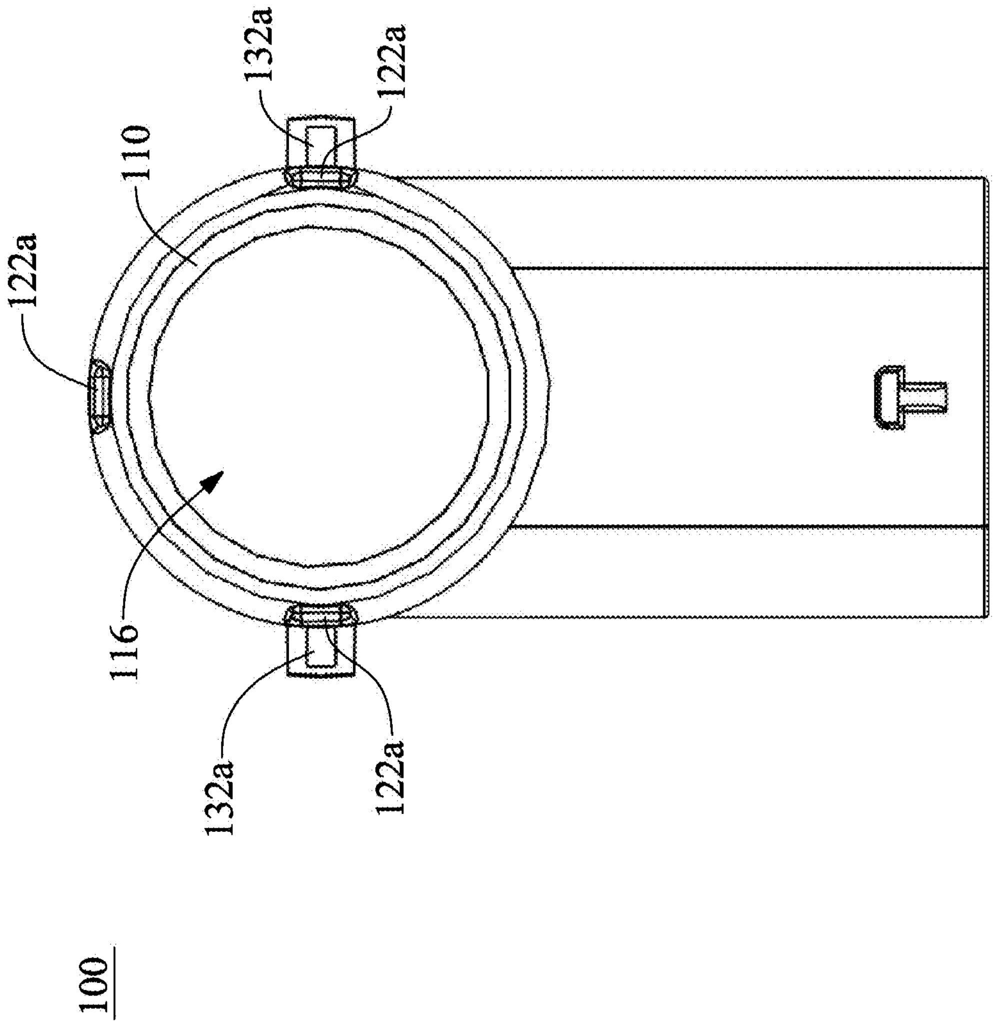
FIG. 4 is a front schematic diagram of FIG. 3.

Referring to FIG. 3 and FIG. 4, FIG. 3 shows a right schematic diagram of the housing in FIG. 2, and FIG. 4 shows a front schematic diagram of FIG. 3. More specifically, the housing 100 is a hollow structure, and includes a front portion 110, a body 120, and a rear portion 130. The front portion 110 is formed to have a front opening 116, the body 120 is disposed between the front portion 110 and the rear portion 130, and the rear portion 130 is formed to have a rear opening 136, wherein the front opening 116 is in communication with the rear opening 136. The front portion 110, the body 120, and the rear portion 130 are arranged sequentially along the longitudinal direction L.

Furthermore, the front portion 110 can slightly appear as a tapered shape, and has an outer diameter gradually increasing along the longitudinal direction L. Thus, when the base 200 and the sensor 300 are assembled with the housing 100 from the rear opening 136 along a direction opposite to the longitudinal direction L, a position of the sensor 300 in the longitudinal direction L can be restricted via a dimension relationship between the front portion 110 and the base 200 or the sensor 300.

In addition, the body 120 includes a body outer wall 122, which is formed to have a plurality of decoupling engaging portions 122*a*. These decoupling engaging portions 122*a* are grooves extending by a length along the longitudinal direction L, and are adapted to engage with the decoupling member 400 when the decoupling member 400 sleeves the housing 100, thereby increasing a binding force between the two. As shown in FIG. 4, the housing 100 defines a circumferential direction, and in an embodiment, the decoupling engaging portions 122*a* are, for example, three in quantity, which are respectively disposed on the left, right, and upper sides in FIG. 4. In other words, these decoupling engaging portions 122*a* are spaced apart non-equidistantly in the circumferential direction. Thus, when the housing 100 and the decoupling member 400 are assembled with each other, the decoupling engaging portions 122*a* can implement a foolproof function, such that the decoupling member 400 is allowed to sleeve or be embedded into the housing 100 in a predetermined direction, further preventing staggering of the elements and achieving effects of improved assembly efficiency and yield rate as well as reduced labor costs.

Figure 5:
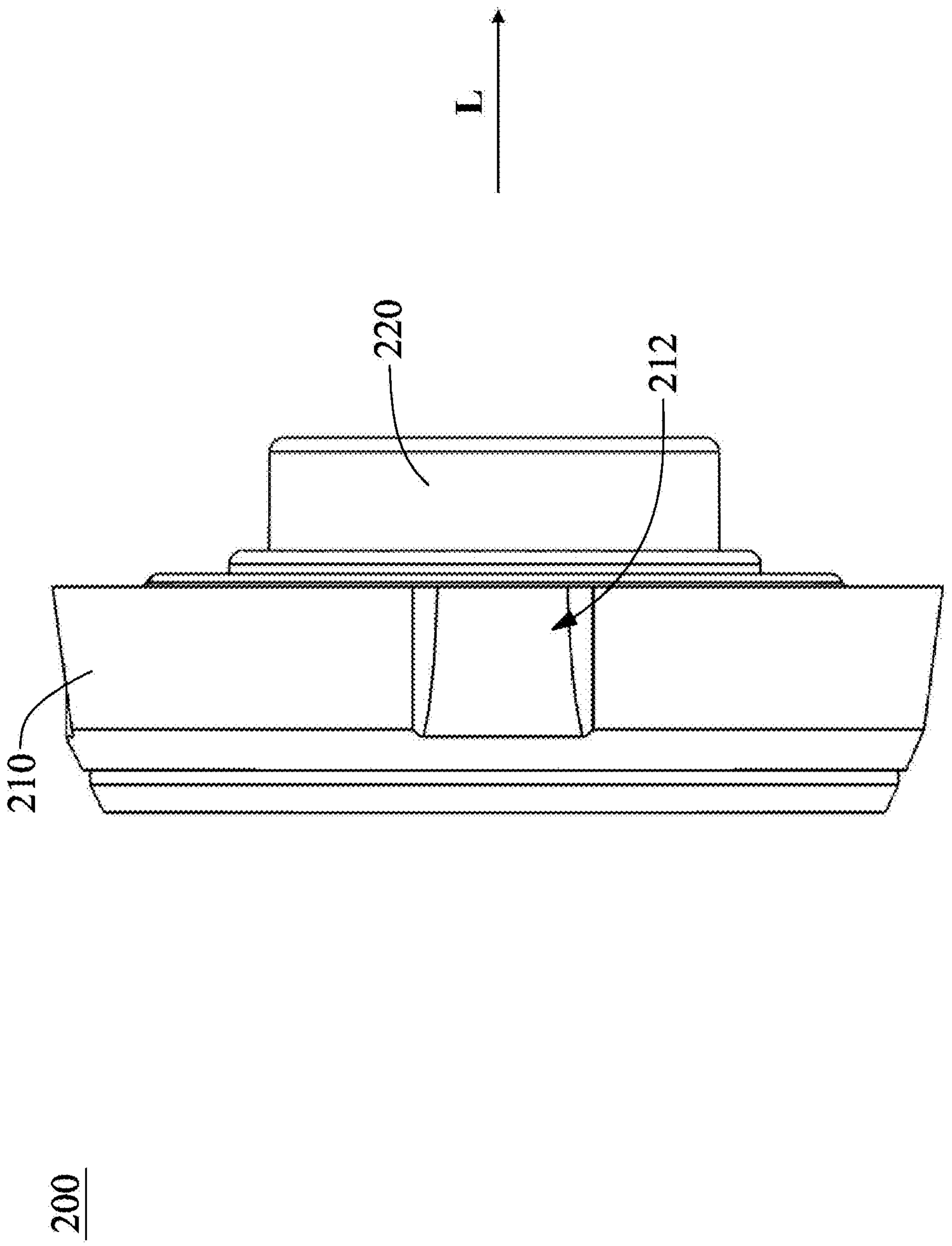
FIG. 5 is a right schematic diagram of the base in FIG. 2.
Figure 6:
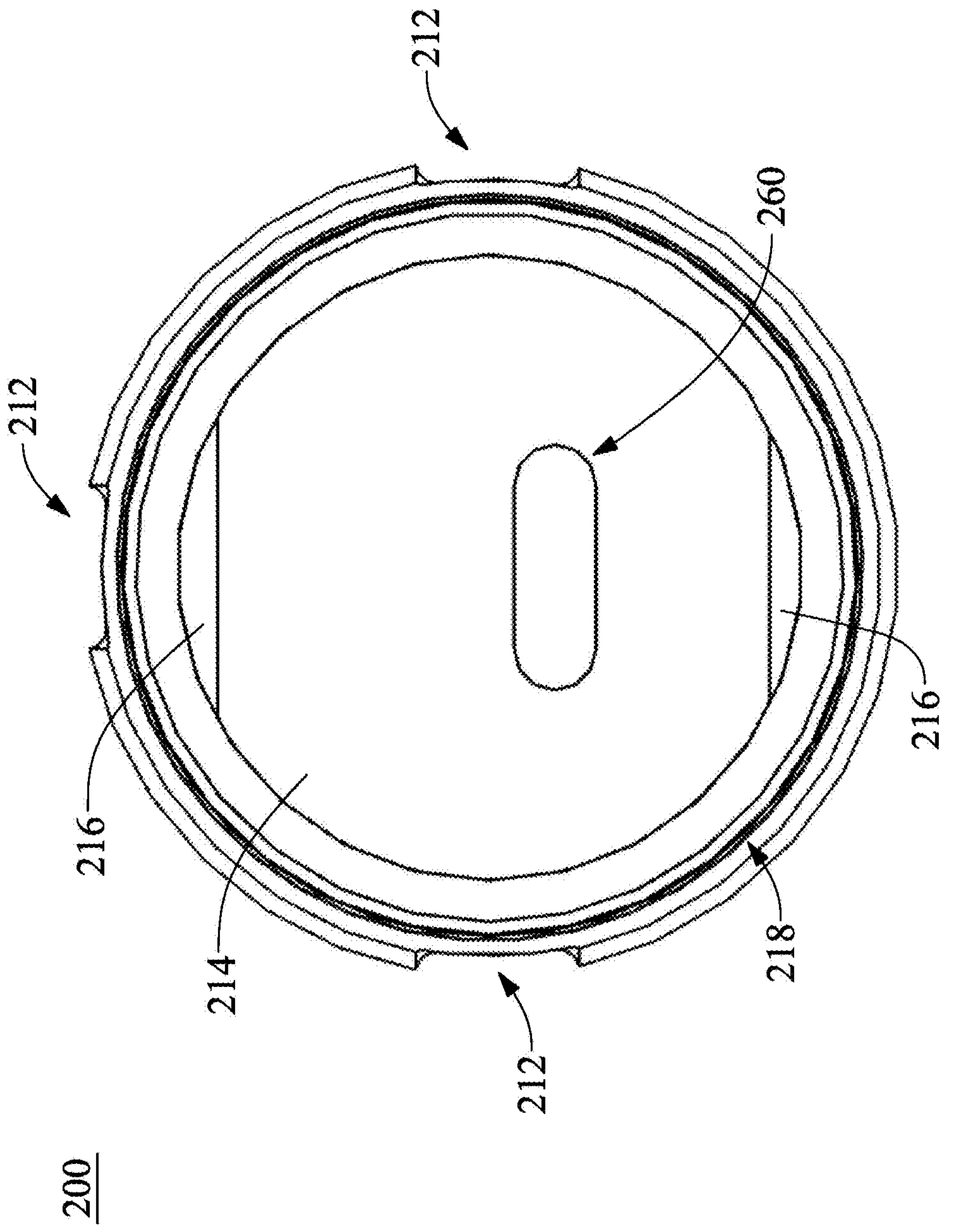
FIG. 6 is a front schematic diagram of FIG. 5.

Referring to FIG. 5 and FIG. 6, FIG. 5 shows a right schematic diagram of the base in FIG. 2, and FIG. 6 shows a front schematic diagram of FIG. 5. More specifically, the base 200 can include a base body 210 and an extension portion 220. The base body 210 and the extension portion 220 are arranged sequentially along the longitudinal direction L, and the extension portion 220 protrudes relative to a rear end surface of the base body 210. Moreover, the base body 210 includes a plurality of engaging portions 212. These engaging portions 212 can be grooves recessed inward along a radial direction, and are, for example, three in quantity, which are disposed on a tapered side surface of the base body 210. The engaging portions 212 have different distances from one another in the circumferential direction defined by the base 200, so as to implement a foolproof effect when assembled with the housing 100.

Furthermore, the base body 210 can further include an accommodating portion 214 and at least one limiting portion 216. The accommodating portion 214 is, for example, a cavity recessed inward along the longitudinal direction L. The limiting portion 216 can be a stepped structure protruding relative to a bottom surface of the accommodating portion 214 and is, for example, two in quantity, which are disposed on upper and lower sides of the base body 210 in FIG. 6. To be embedded with the sensor 300, the base 200 is preferably formed to have a through hole 260. The through hole 260 passes through the base body 210 and the extension portion 220 along the longitudinal direction L, allowing a portion of the sensor 300 to pass through and generate a limiting effect.

In some embodiments, the base body 210 is formed to further include a fastening channel 218. The fastening channel 218 is, for example, disposed on a side surface of the base body 210 along the circumferential direction, and can provide a more secure binding force when an interference fit is formed between the housing 100 and the base 200, preventing displacement along the longitudinal direction L and the radial direction between the housing 100 and the base 200, with associated details to be provided below.

Figure 7:
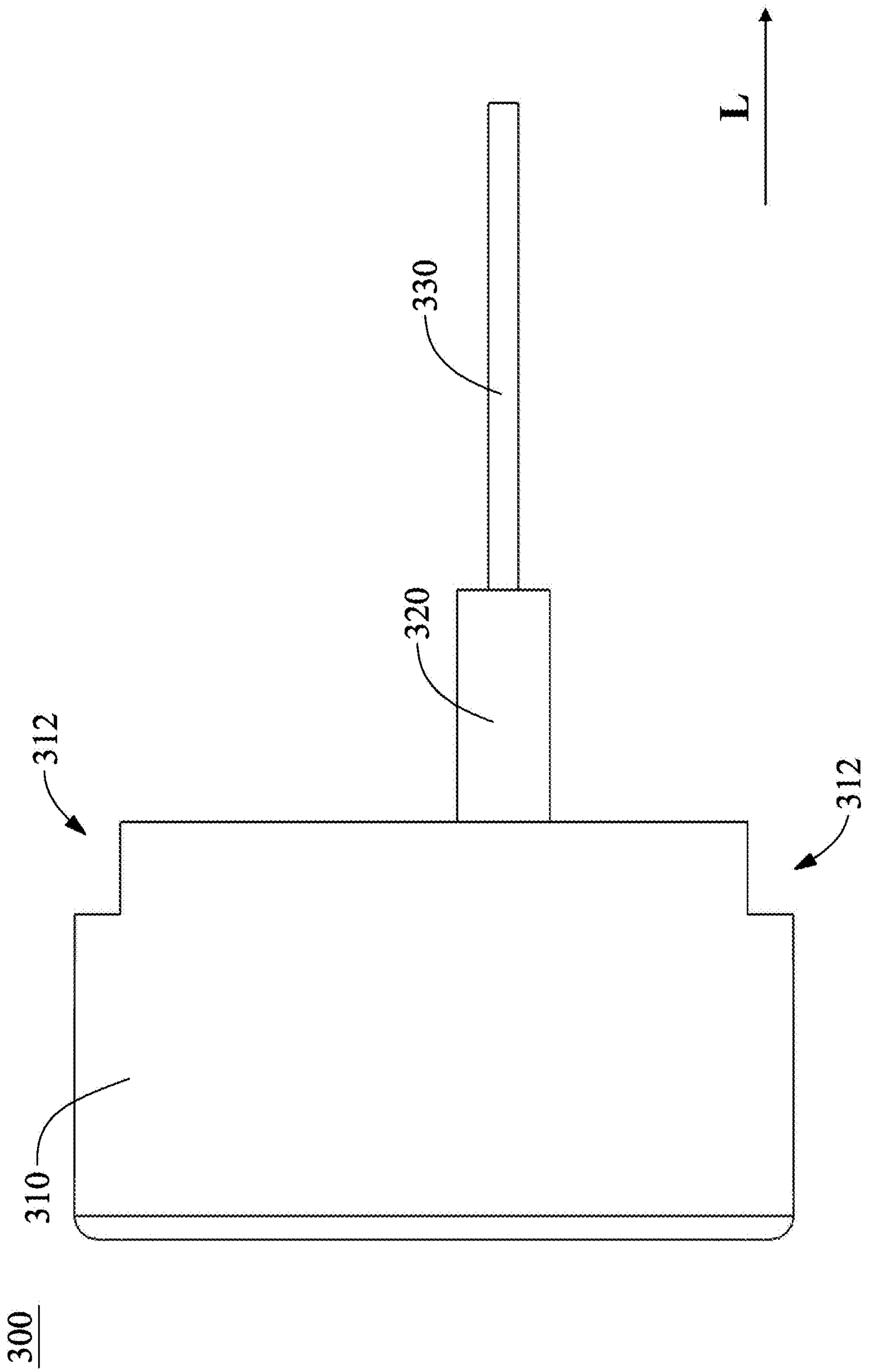
FIG. 7 is a right schematic diagram of the sensor in FIG. 2.

Referring to FIG. 7, FIG. 7 shows a right schematic diagram of the sensor in FIG. 2. As shown in the drawing, the sensor 300 of an embodiment includes a sensor body 310, an insulating portion 320, and a terminal portion 330. The sensor body 310 is, for example, a hollow housing made of an aluminum metal and accommodating therein an electronic element for transmitting and sensing ultrasonic waves. The insulating portion 320 is, for example, made of an electrically insulative rubber or plastic, and is configured to be embedded with the base 200. The terminal portion 330 is, for example, a contact pin made of a metal, is two in quantity that are electrically connected to the electronic element in the sensor body 310, and can serve as a connection bridge between the sensor 300 and another circuit or electronic element. However, in other embodiments, the terminal portion 330 can also be a wiring formed by a twisted pair, which can be straight, curved, or bent at a predetermined region, but is not specifically limited by the present disclosure. In an embodiment, the sensor body 310 is formed to have at least one limiting feature 312. The limiting feature 312 is, for example, a recess having a shape corresponding to the limiting portion 216, and is, for example, two in quantity, which are respectively disposed on upper and lower sides of the sensor body 310 in FIG. 7.

Figure 8:
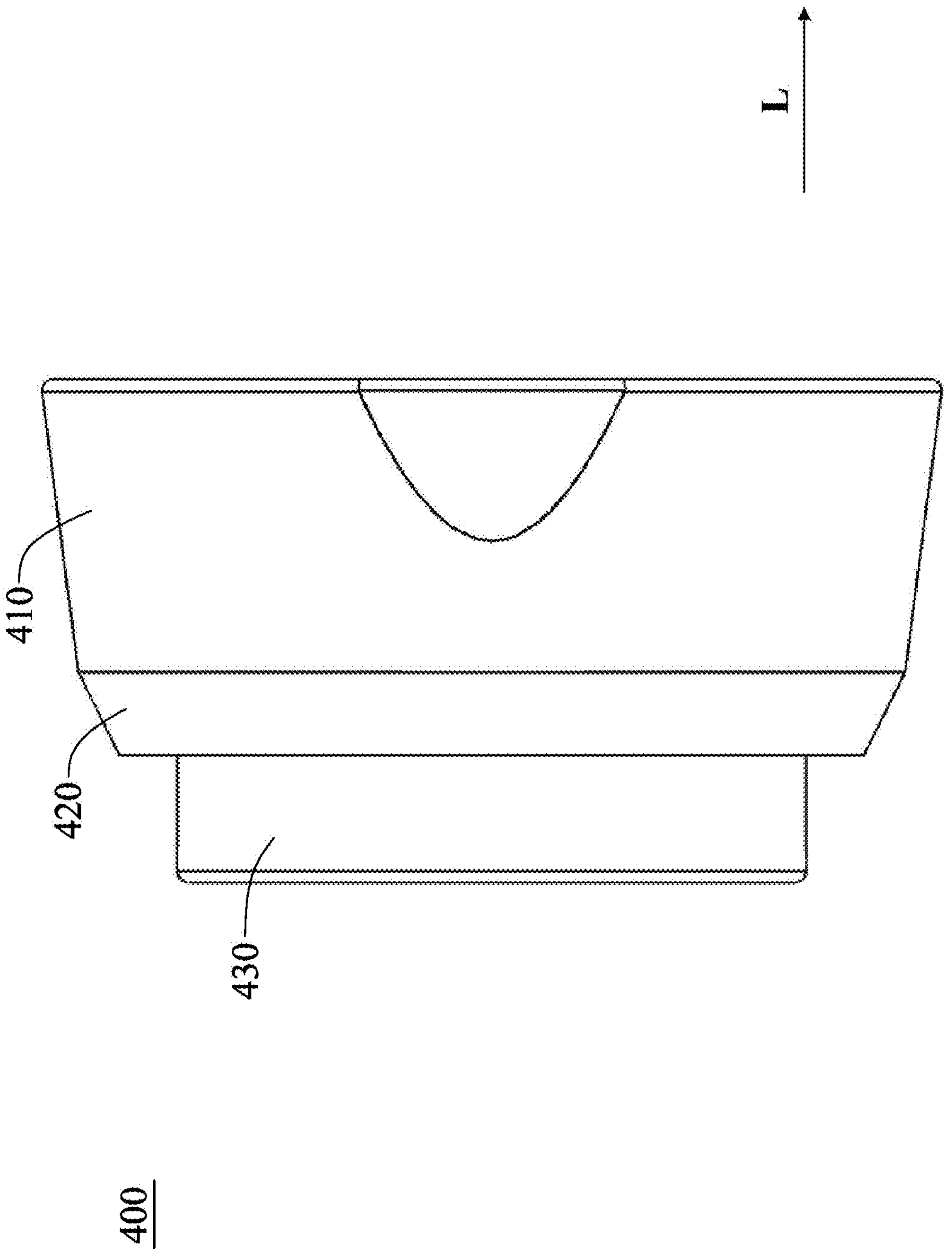
FIG. 8 is a right schematic diagram of the decoupling member in FIG. 2.
Figure 9:
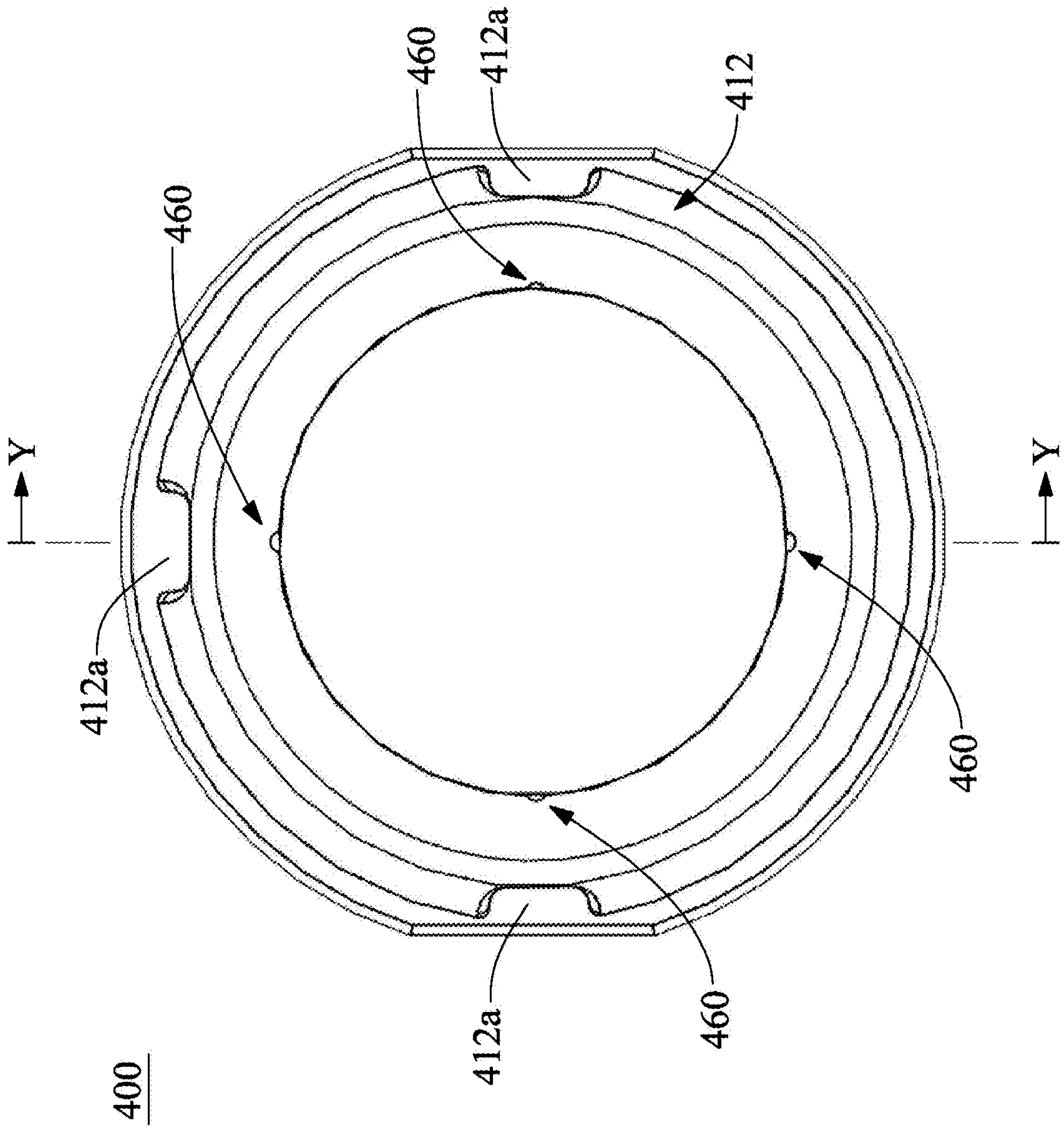
FIG. 9 is a rear schematic diagram of FIG. 8.
Figure 10:
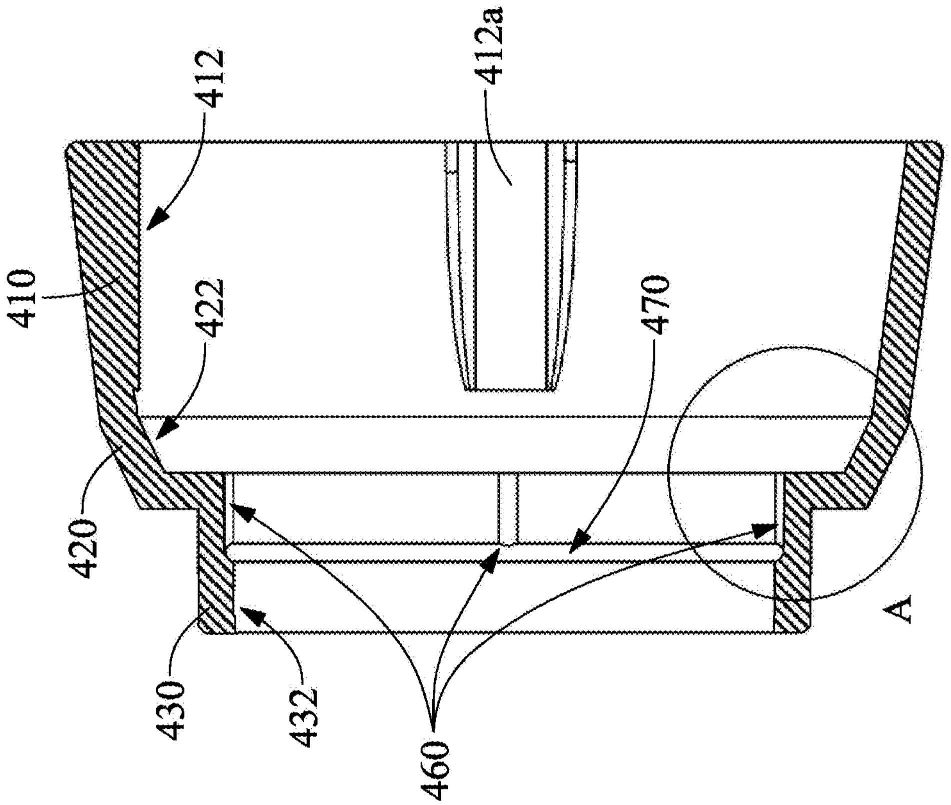
FIG. 10 is a cross-sectional schematic diagram of FIG. 9 along section line Y-Y.
Figure 11:
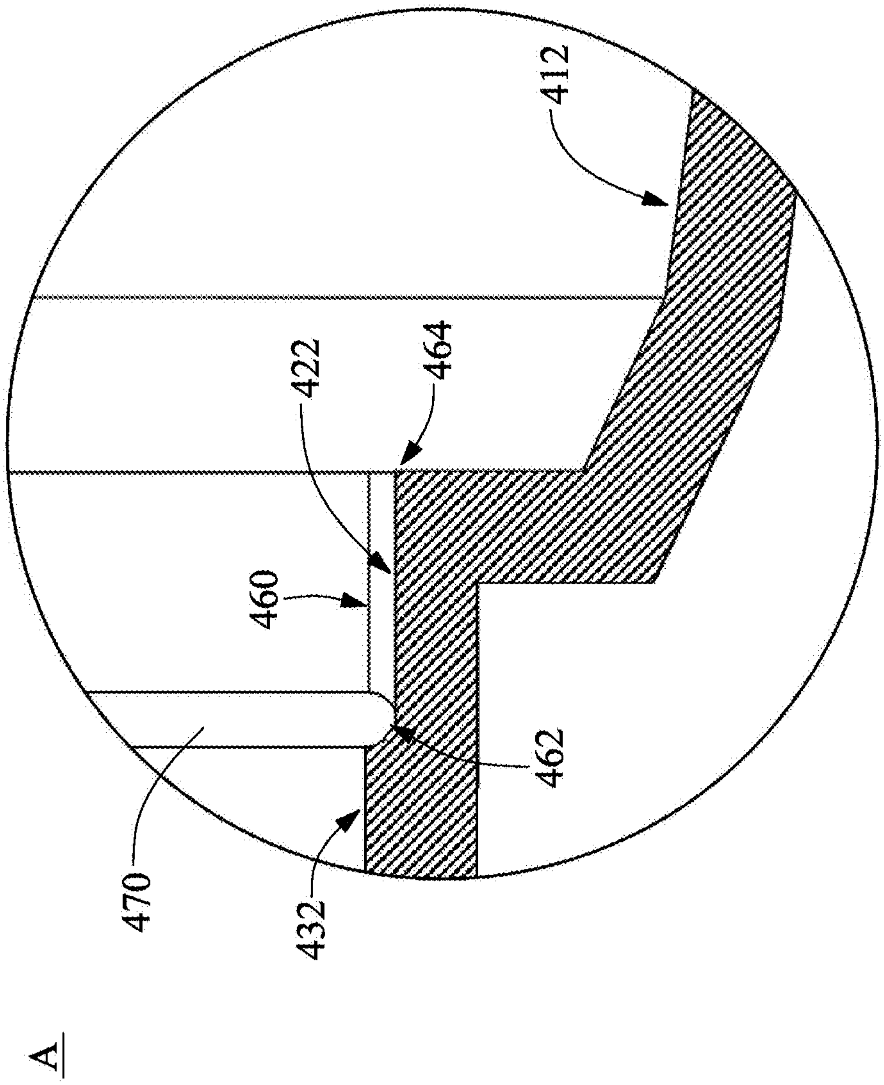
FIG. 11 is an enlarged diagram of the region A in FIG. 10.

Referring to FIG. 8 to FIG. 11, FIG. 8 shows a right schematic diagram of the decoupling member in FIG. 2, FIG. 9 shows a rear schematic diagram of FIG. 8, FIG. 10 shows a cross-sectional schematic diagram of FIG. 9 along section line Y-Y, and FIG. 11 shows an enlarged diagram of the region A in FIG. 10. The decoupling member 400 of an embodiment is, for example, a hollow structure, and includes a decoupling body 410, a connection portion 420, and a constricted portion 430. An outer diameter of the decoupling body 410 is larger than an outer diameter of the constricted portion 430, the connection portion 420 is connected between the decoupling body 410 and the constricted portion 430, and an outer diameter of the connection portion 420 gradually increases along the longitudinal direction L. As shown in FIG. 9 and FIG. 10, the decoupling body 410, the connection portion 420, and the constricted portion 430 include a first inner wall 412, a second inner wall 422, and a third inner wall 432, respectively. The first inner wall 412 is formed to have a plurality of housing engaging portions 412*a*. These housing engaging portions 412*a* are, for example, ribs protruding inward relative to the first inner wall 412 along a radial direction, are three in quantity, and have positions and shapes corresponding to the decoupling engaging portions 122*a*. Thus, when the housing 100, the sensor 300, and the decoupling member 400 are assembled with one another, the decoupling body 410 can be attached to a surface of the housing 100, thereby preventing external contaminants from entering the inside of the vehicle radar 1.

In some severe environments, a minute amount of moisture between the sensor 300 and the decoupling member 400 can easily condense into water droplets due to a low ambient temperature, or even freeze into frost to further affect a sensing result of the sensor 300. In view of the above, the decoupling member 400 of an embodiment is formed to have at least one drainage channel 460 on the third inner wall 432, and the drainage channel 460 is in communication with an exterior of the housing 100. Water droplets that are condensed on the surface of the sensor 300 can then sequentially flow through the third inner wall 432, the second inner wall 422, and the first inner wall 412 along the drainage channel 460 to eventually flow to the exterior of the housing 100, instead of residing inside the vehicle radar 1, thereby prolonging the service life of the vehicle radar 1.

In addition, the decoupling member 400 can further provide a function of collecting water droplets in different areas for storage and then the stored water droplets are centralized for drainage. More specifically, in an embodiment, the drainage channel 460 is provided as, for example, four in quantity, which are spaced apart equidistantly along the circumferential direction of the decoupling member 400. In FIG. 11, the drainage channel 460 has a first end 462 and a second end 464. The first end 462 is disposed between the sensor 300 and the second end 464, and when the vehicle radar 1 is disposed in a vehicle, a height of the first end 462 is greater than or equal to that of the second end 464. On the other hand, the decoupling member 400 is further formed to have a storage tank 470. The storage tank 470 is disposed between the sensor 300 and the drainage channels 460, extends along the circumferential direction to form a recess having an enclosed loop shape, and is in communication with all of the drainage channels 460. With the configuration above, when water droplets are condensed on an upper surface or a side surface of the sensor 300 and cannot be easily discharged out of the housing 100 merely by gravity, the water droplets can still flow via neighboring drainage channels 460 and be collected and stored in the storage tank 470. When an amount of a liquid reaches a set threshold, the liquid then flows via the drainage channel 460 below from the first end 462 to the second end 464, hence preventing the water droplets or frost from accumulating in a specific area on the surface of the sensor 300.

Figure 12:
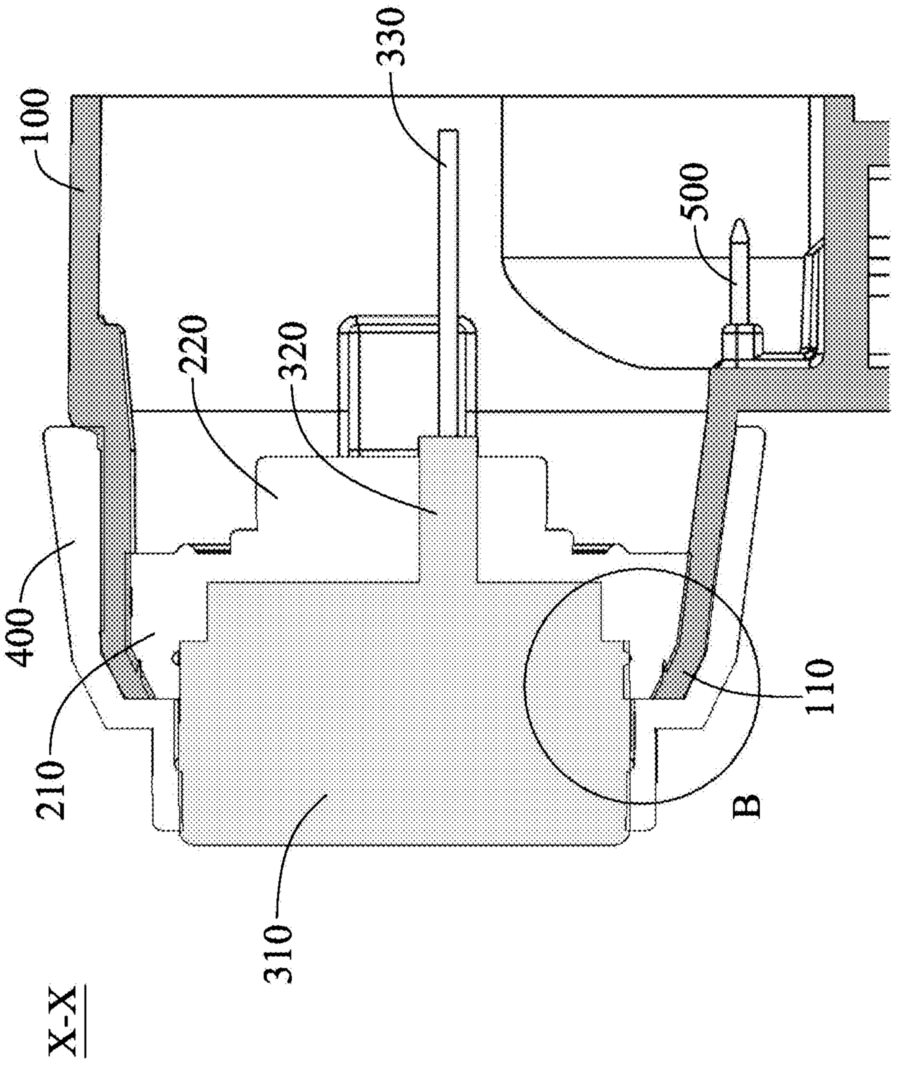
FIG. 12 is a cross-sectional schematic diagram of FIG. 1 along section line X-X.
Figure 13:
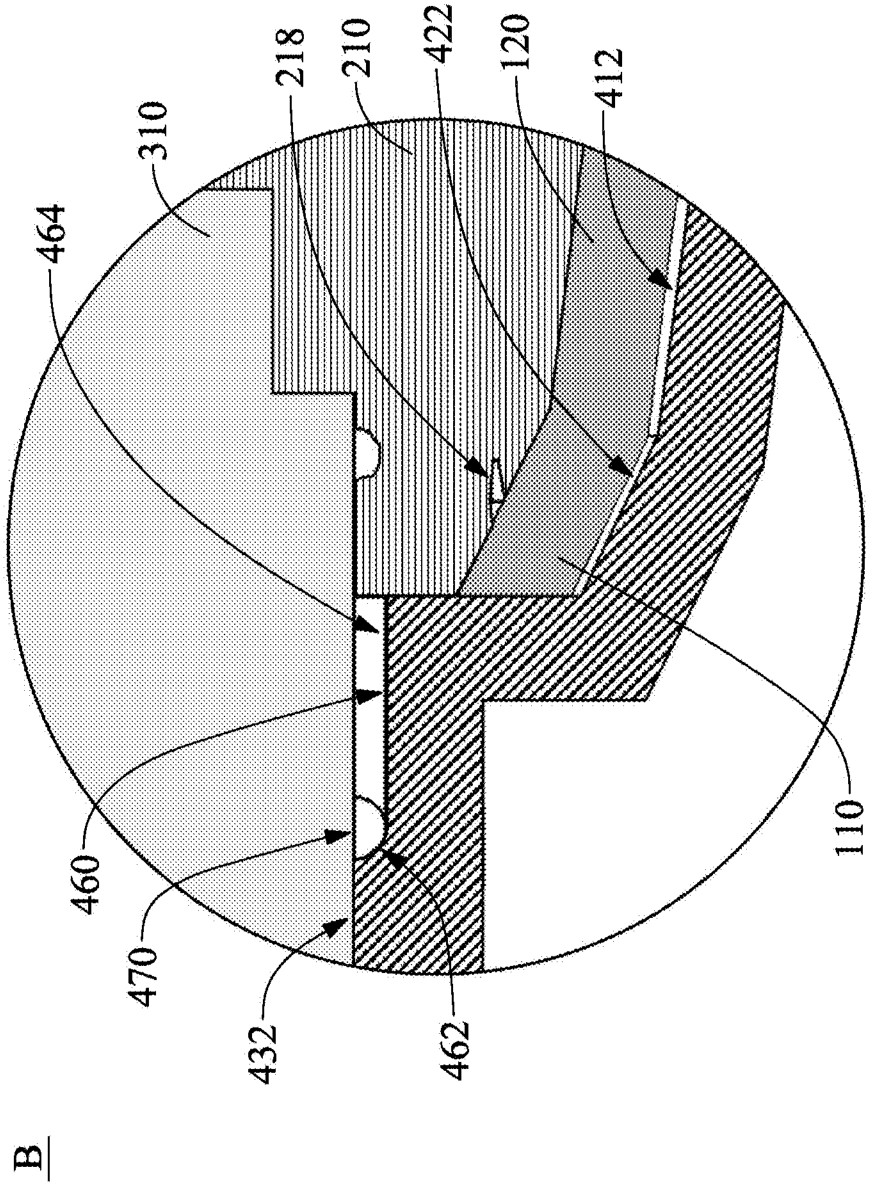
FIG. 13 is an enlarged diagram of the region B in FIG. 12.

Referring to FIG. 12 and FIG. 13, FIG. 12 shows a cross-sectional schematic diagram of FIG. 1 along section line X-X, and FIG. 13 shows an enlarged schematic diagram of the region B in FIG. 12. To assemble the vehicle radar 1, the sensor body 310 can be disposed on the base body 210, and the insulating portion 320 and the terminal portion 330 are inserted into the through hole 260. At this point in time, the limiting portion 216 and the limiting feature 312 are aligned with each other to ensure tight coupling between the base 200 and the sensor 300, and the sensor 300 is fixed at the base 200 by a fixing means such as an adhesive. Then, the housing 100 and the base 200 are fixed with each other via the engaging structure between the two, and the base 200 is abutted against the front portion 110 of the housing 100, such that a portion of the sensor body 310 protrudes relative to the front portion 110. At this point in time, a pressure can be applied to produce an interference fit between the housing 100 and the base 200, thereby locating a portion of the inner wall of the housing 100 in the fastening channel 218 and reinforcing the coupling strength with each other. It should be noted that, in some embodiments, the sensor 300 can also be completely accommodated in the housing 100, but is not specifically limited by the present disclosure.

Next, the decoupling member 400 is caused to sleeve the housing 100 and the sensor 300, so that the decoupling member 400 covers the portion of the sensor body 310 protruding relative to the front portion 110 and the front portion 110. Compared with a conventional configuration in which a decoupling element covers only an edge of a transducer, the decoupling member 400 of an embodiment also covers the front portion 110 of the housing 100. Thus, warping does not occur even when deformation is generated under use over an extended period of time. While a shielding effect is enhanced, gaps are also unlikely to occur between the housing 100 and the decoupling member 400, hence reducing the probability of entering the inside by substances such as moisture.

On the other hand, as shown in FIG. 13, when the decoupling member 400 abuts against the sensor 300, a gap is formed between the third inner wall 432 and the sensor 300, hence ensuring that the decoupling member 400 does not tightly envelop the sensor 300. Thus, condensed water droplets are allowed to more easily pass through the drainage channels 460 and the storage tank 470, and so interference with vibrations caused by transmission and reception of signals of the sensor 300 is not caused even if the vehicle body generates large vibrations. With the configuration above, the drainage channels 460 and the storage tank 470 are able to guide water droplets on the surface of the sensor 300 from the first end 462 to the second end 464 and discharge the water droplets to the exterior of the housing 100, and are further able to reduce a negative pressure generated during the assembly of internal elements of the vehicle radar 1, thereby improving stability and convenience of automated installation.

The present disclosure is described by way of the preferred embodiments above. A person skilled in the art should understand that, these embodiments are merely for describing the present disclosure, and are not to be construed as limitations to the scope of the present disclosure. It should be noted that all equivalent changes, replacements and substitutions made to the embodiments are encompassed within the scope of the present disclosure. Without causing conceptive contradictions or structural conflicts, the technical features of the embodiments above can be appropriately combined, substituted, replaced, omitted and modified. Therefore, the legal protection for the present disclosure should be defined by the appended claims.

What is claimed is:

1. A vehicle radar, comprising:

a sensor;

a housing, accommodating at least a portion of the sensor; and a decoupling member, abutting against the sensor, formed to have at least one drainage channel in communication with an exterior of the housing, wherein the decoupling member is further formed to have a storage tank, which is disposed between the sensor and the at least one drainage channel and is in communication with the at least one drainage channel, wherein the decoupling member defines a circumferential direction, and the storage tank extends along the circumferential direction and has an enclosed loop shape, and wherein the decoupling member is a rubber sleeve.

2. The vehicle radar according to claim 1, wherein the housing comprises a front portion, the sensor protrudes relative to the front portion, and the decoupling member covers another portion of the sensor and the front portion.

3. The vehicle radar according to claim 1, wherein the decoupling member sleeves the sensor and comprises an inner wall, the storage tank is formed on the inner wall, and a gap is formed between the inner wall and the sensor.

4. The vehicle radar according to claim 1, wherein the at least one drainage channel is plural in quantity, and the plurality of drainage channels are spaced apart equidistantly along the circumferential direction.

5. The vehicle radar according to claim 1, wherein the at least one drainage channel has a first end and a second end, the first end is disposed between the sensor and the second end, and when the vehicle radar is disposed in a vehicle, a height of the first end is greater than or equal to that of the second end.

6. The vehicle radar according to claim 1, wherein the housing comprises a plurality of decoupling engaging portions, the decoupling member comprises a plurality of housing engaging portions, and the plurality of decoupling engaging portions are engaged with the plurality of housing engaging portions.

7. The vehicle radar according to claim 6, wherein the plurality of housing engaging portions are spaced apart non-equidistantly along the circumferential direction.

* * * * *